US012359509B2

(12) United States Patent
Delaney et al.

(10) Patent No.: US 12,359,509 B2
(45) Date of Patent: Jul. 15, 2025

(54) ADJUSTABLE STANDOFF FOR PLATFORM HOIST

(71) Applicant: JOBOB Investments, Inc., Kennett Square, PA (US)

(72) Inventors: Robert A. Delaney, Kennett Square, PA (US); Nicholas P. Bleiler, Parksburg, PA (US)

(73) Assignee: JOBOB INVESTMENTS, INC., Kennett Square, PA (US)

( * ) Notice: Subject to any disclaimer, the term of this patent is extended or adjusted under 35 U.S.C. 154(b) by 994 days.

(21) Appl. No.: 17/412,377

(22) Filed: Aug. 26, 2021

(65) Prior Publication Data

US 2022/0063967 A1 Mar. 3, 2022

Related U.S. Application Data

(60) Provisional application No. 63/073,012, filed on Sep. 1, 2020.

(51) Int. Cl.
*E06C 7/48* (2006.01)

(52) U.S. Cl.
CPC .......... *E06C 7/48* (2013.01); *B66D 2700/023* (2013.01)

(58) Field of Classification Search
CPC ... E06C 7/48; E06C 7/12; E06C 7/423; B66D 2700/023
USPC .......... 182/214; 248/210, 238, 237; 414/814
See application file for complete search history.

(56) References Cited

U.S. PATENT DOCUMENTS

| | | | | |
|---|---|---|---|---|
| 4,643,274 A * | 2/1987 | Tataseo | E06C 7/48 | 182/129 |
| 5,855,252 A * | 1/1999 | Vrolyks | E06C 7/48 | 182/214 |
| 5,911,287 A * | 6/1999 | Campbell | E06C 7/12 | 182/103 |
| 7,556,125 B1 * | 7/2009 | Blehm | E06C 7/488 | 182/214 |
| 9,217,285 B2 * | 12/2015 | Connors | E06C 7/48 | |
| 9,488,001 B2 * | 11/2016 | Cherevko | E06C 1/06 | |
| 2005/0139425 A1 * | 6/2005 | Thomas | E06C 1/34 | 182/214 |

(Continued)

FOREIGN PATENT DOCUMENTS

GB 2118236 A * 10/1983 ............... E06C 7/48

OTHER PUBLICATIONS

English translation of GB document. (Year: 1983).*

*Primary Examiner* — Janet M Wilkens
(74) *Attorney, Agent, or Firm* — Stradley Ronon Stevens & Young, LLP

(57) ABSTRACT

An adjustable standoff for a platform hoist that can withstand hoisting objects along a track to a predetermined height weighing up to 500 pounds. The adjustable standoff for a platform hoist includes: (1) a frame having two side assemblies with hooks to attach the standoff to only the rungs and thereby avoid blocking the side rails that act as the track for the hoist; (2) two legs that are able to adjusted radially within the plane of the side assemblies so that the standoff can withstand the force exerted by loads weighing 500 pounds being hoisted up; and (3) an anchor section to securely fasten the hoist to the structure to avoid the hoist sliding down the ridge of the roof and allowing the heavy loads to crash to the ground with potentially catastrophic consequences for both the structure and the operators below.

20 Claims, 13 Drawing Sheets

(56) References Cited

U.S. PATENT DOCUMENTS

| | | | | |
|---|---|---|---|---|
| 2006/0231333 | A1* | 10/2006 | Proulx | E06C 7/146<br>182/107 |
| 2009/0194368 | A1* | 8/2009 | Price | E04G 21/3276<br>182/145 |
| 2010/0213007 | A1* | 8/2010 | Richards | E06C 1/08<br>182/107 |

* cited by examiner

ADJUSTABLE STANDOFF FOR PLATFORM HOIST

CROSS-REFERENCE TO RELATED APPLICATION

This application claims the benefit of U.S. Provisional Application No. 63/073,012, titled, "Adjustable Standoff for Platform Hoist," filed Sep. 1, 2020, the content of which is incorporated herein by reference in its entirety.

TECHNICAL FIELD

The present invention generally relates to hoisting systems and, more particularly, to an adjustable standoff for the hoisting system that permits the system to be secured to the roof or exterior wall of a structure and raise or lower up to five hundred pounds of material without damaging any part of the structure by preventing the track from contacting the structure.

BACKGROUND OF THE INVENTION

For decades roofers and other construction professionals have used platform hoists as a safe alternative to carrying materials up a ladder. Such hoists loop a cable over the top of a track and attach it to a carriage thereby allowing the contractor to pull the material up the track either manually or via the use of an engine or motor. Typically, the hoists simply lean against the edge of a structure, similar to how a ladder is used. However, as the engines and motors have become more powerful, the weight of the loads the hoists transport has increased significantly. For example, the EH-500 from SafetyHoist® transports loads up to 500 pounds.

This increased load weight can cause significant damage to the structure. For example, if the structure has an existing gutter system or a drip edge and the bottom surface of the track is placed against either of these elements, the hoisting of a 500 pound load will cause damage to these elements. The hoist must also be secured to the structure. Failure to secure the hoist could result in it toppling over, causing the materials the hoist is transporting to crash to the ground with catastrophic consequences for both the structure and operators below. Such securing is complicated by the fact that the entire length of the track of the hoist must remain clear to allow the platform to travel the entire length of the track (i.e., bottom to top).

In the ladder industry, standoffs are used to protect vulnerable sections of the structure, such as gutters and drip edges. These devices are many and varied in design and may prevent damage from the ladder leaning against the structure. However, an operator cannot simply substitute a standoff for a ladder as a standoff for a hoist for at least four reasons. First, the highest load capacity for any ladder is only 375 pounds (e.g., Louisville Ladder's Little Giant). Ladder standoff are simply not designed to handle loads up to 500 pounds. Second, ladder standoffs engage the rails of the ladder which blocks the carriage of the hoist from traveling the entire length of track thereby rendering the hoist useless. Third, ladder standoffs do not include anchor plates to secure the ladder to the structure with removable fasteners. While ladders should be secured to the structure to prevent them from toppling over, because of the different intended load capacities ladder standoffs do not include heavy anchor bars capable of supporting loads in excess of 375 pounds whereas the tracks of the hoist must be secured so that loads up to 500 pounds can be safely raised and lowered. Fourth, most ladder standoffs are not adjustable and therefore cannot engage with exterior walls as well as different roof pitches. As a result, a ladder standoff cannot be incorporated into a hoist system to provide the support an security necessary to safely operate the hoist.

Accordingly, there is an immediate need for an apparatus that is adjustable and can be secured to both exterior walls and/or the roof of a structure. The apparatus also must prevent the rails of a platform hoist from contacting the structure while not restricting the movement of the carriage up and down the track. Finally, the apparatus must be able to handle loads of up to 500 pounds.

BRIEF SUMMARY OF THE INVENTION

To meet this and other needs, and in view of its purposes, an adjustable standoff for a platform hoist is disclosed. Because of its adjustability, the standoff can be secured to different elements of a structure, such as its exterior walls or roof. Roofs have different pitches and the presently described adjustable standoff can handle flat roofs up to roofs having a pitch of 15 by 12. Furthermore, by designing the frame of the adjustable standoff to solely engage with the rungs of the platform hoist, the movement of the carriage up and down the hoist is not restricted. Finally, as the legs of the standoff remain in the same plane as the rails of the hoist and can be adjusted to contact the structure at a substantially perpendicular angle to the plane of the structure thereby avoiding any damage to the structure. The apparatus can support loads of up to 500 pounds without failing, which could cause significant damage to the structure or operators below. Simply put, heavy loads can be safely transported up and down the track of the platform hoist.

One non-limiting embodiment an adjustable standoff for mounting on two upper rungs of a material transport apparatus, having side rails connected by a plurality of rungs extending between the side rails, is disclosed. The standoff includes a frame having a length and a width. The frame is made of two side assemblies, with a top edge opposite a bottom edge and a flange edge opposite a stabilizer edge. The assemblies are aligned along opposite lengths of the frame. Each assembly includes a top flange closer to the top edge than a bottom flange, with each flange projecting inward from the flange edge of one assembly in the direction of the opposite assembly. A hook for connecting the standoff to the top rungs of the material transport apparatus projects outward from each flange. Each assembly also includes an apse projecting from the stabilizer edge at a location closer to the bottom edge than the top edge. The semi-circular apse defines a radial edge and has a center hole and a plurality of outer radius holes closer to the radial edge than the center hole. The placement of these holes permits the legs of the standoff to be adjusted to work with different pitches of roofs. The two side assemblies are connected by a stabilizer section running the width of the frame connecting the stabilizer edge of each side assembly. Furthermore, the location that the stabilizer section contacts the stabilizer edges of both side assemblies is between the apse and the top edge but is closer to the apse than the top edge. Two rotationally adjustable legs are connected to the assemblies. Each leg has an assembly edge and opposite anchor edge along with a pivot hole, an adjustment hole, and an anchor hole. The pivot holes are closer to the assembly edges than the adjustment holes which is closer to the assembly edges than the anchor holes. Furthermore, the legs are connected to opposite sides of the frame with removable fasteners that pass through the pivot holes and the central holes and the legs are further adapted to be adjusted along the radius edge of the apse by removable fasteners passing though the adjustment holes and one of the outer radius holes. Finally, an anchor section is attached to the anchor side of the legs. The anchor section including a plate having a plurality of holes adapted to permit the anchor plate to be connected to a roof, structure, or exterior wall with removable fasteners. The anchor plate is connected to the legs by two leg flanges that projecting in a substantially perpendicular direction from the anchor plate. Each leg flange includes a leg hole, wherein the anchor section is connected to the legs by removable fasteners passing through the leg holes and the anchor holes.

In certain embodiments, the top flanges and bottom flanges of the assemblies projects in a substantially perpendicular direction to the plane of the flange edge.

In certain embodiments, the hooks on the top flanges are smaller than the hooks on the bottom flanges. Furthermore, the hooks of the flanges and the flanges themselves may each contain holes that are aligned with holes on the top flange and are adapted to accept a locking pin passing through the hook and the top flange to further secure the upper rungs of the material transport apparatus to the hooks.

In certain embodiments, the apse may further include at least one stabilizer hole adapted to engage a projection on a stiffener beam so that the stiffener beam is substantially perpendicular to the stabilizer section. Such a configuration may minimize twisting and warping of the frame as significant weight is hoisted up the material transport apparatus.

In certain embodiments, the outer radius holes of the apse are adapted to permit the legs to be adjusted along the radius edge between 20 and about 90 degrees from the bottom edge. About meaning plus or minus 5 degrees. Furthermore, in such embodiments there may be seven outer radius holes equally spaced along the radius edge.

In certain embodiments, the legs may further include a top side opposite a bottom side and with each leg including a leg flange projecting from the top side in a direction substantially perpendicular to the plane of the leg. Furthermore, such legs may include a fourth hole located the same distance from the anchor hole towards the assembly edge that the adjustment hole is located from the pivot hole. With such a four hole configuration, the same design may be attached to either side assembly of the frame.

In certain embodiments, the anchor section may include two anchor plates with each anchor plate is attached to an individual one of the legs.

Finally certain embodiments may incorporate the above described adjustable standoff attached to the upper rungs of a material transport apparatus that includes a track comprising two rails connected by a plurality of rungs, a peak connecting the rails at one end of the track, and a pulley connected to the peak along with a carriage connected to the pulley system and adapted to move up and down the track.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
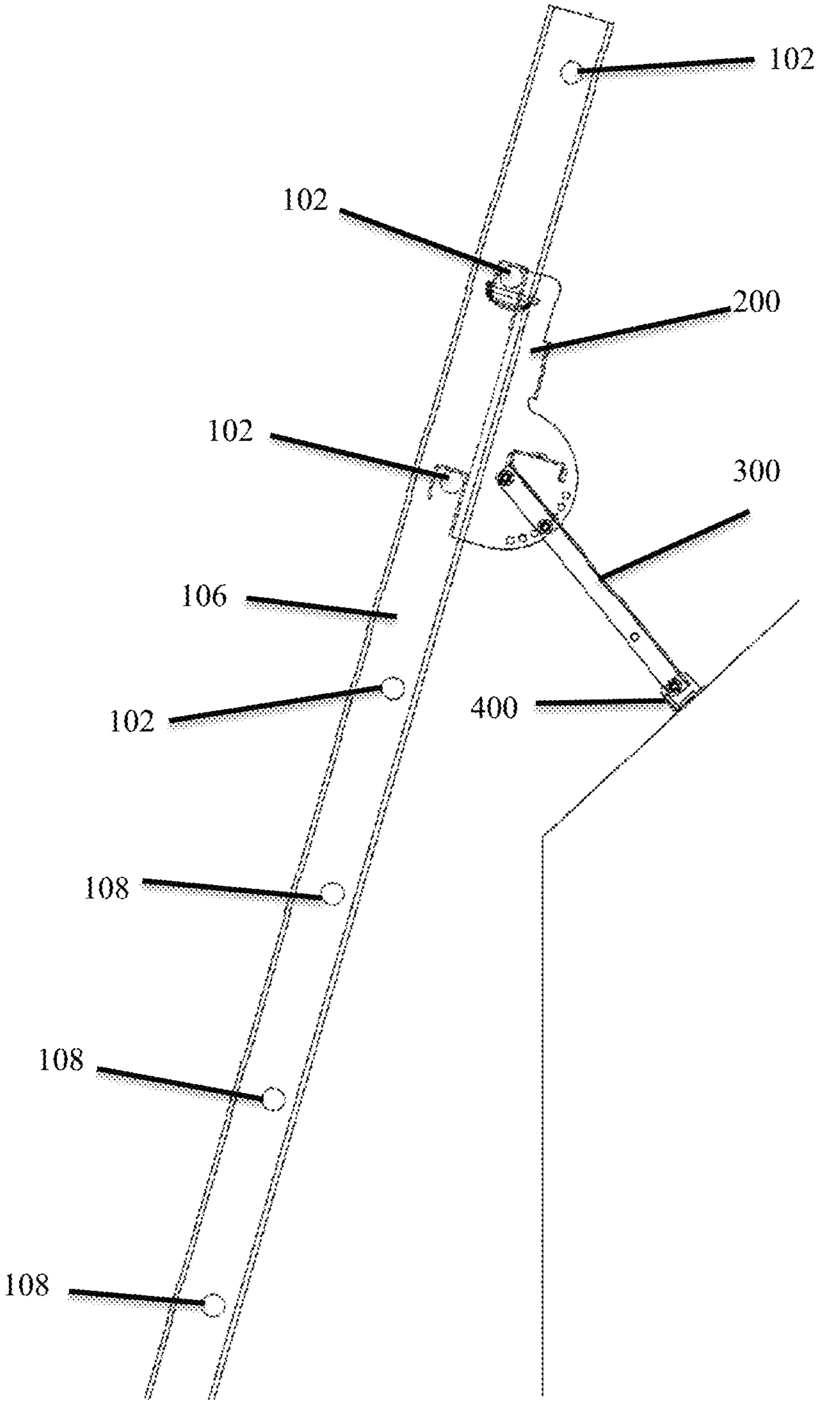
FIG. 1 is a side view of one embodiment of a platform hoist including an adjustable standoff.
Figure 2A:
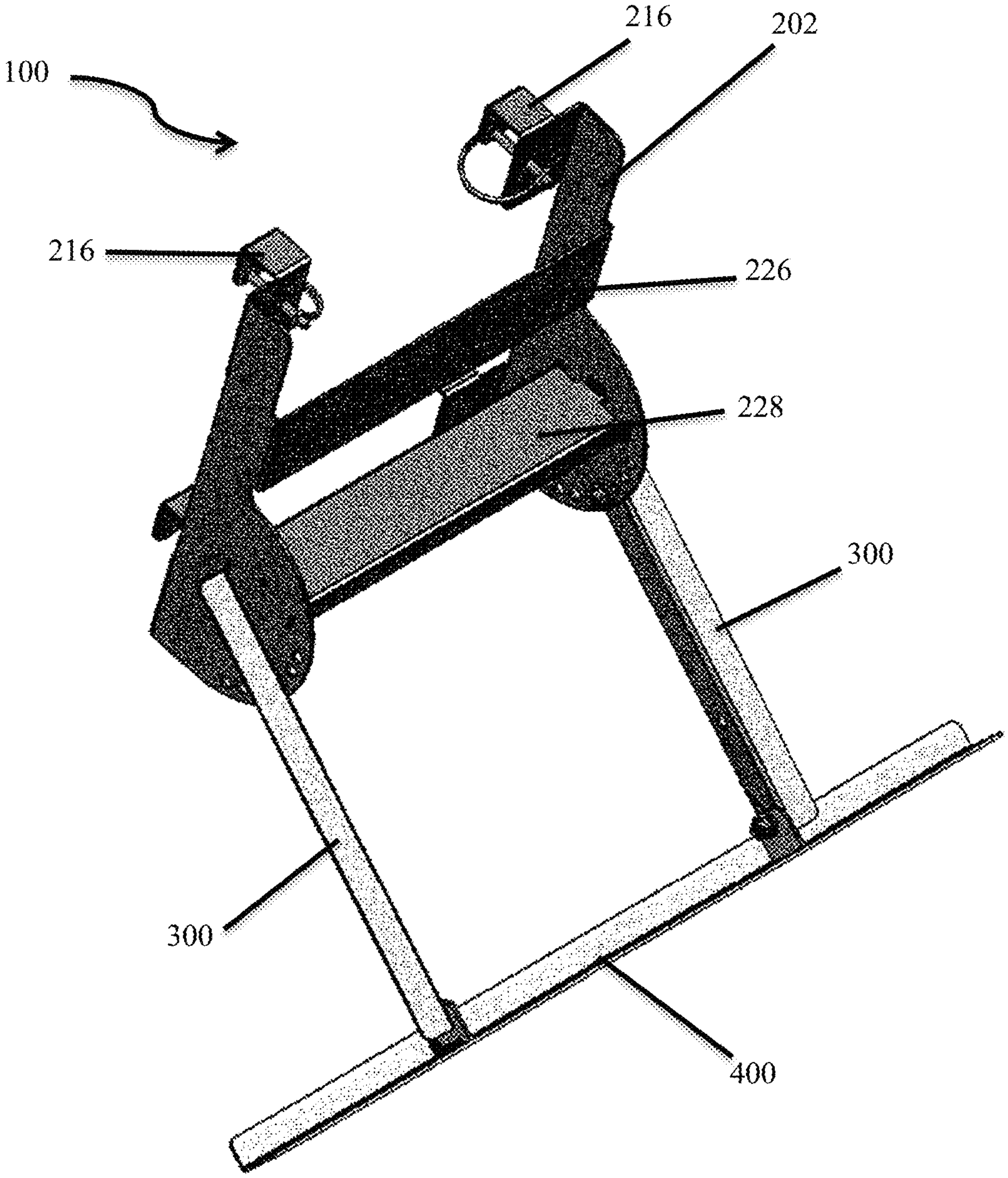
FIG. 2A is a perspective view of one embodiment of the adjustable standoff.
Figure 2B:
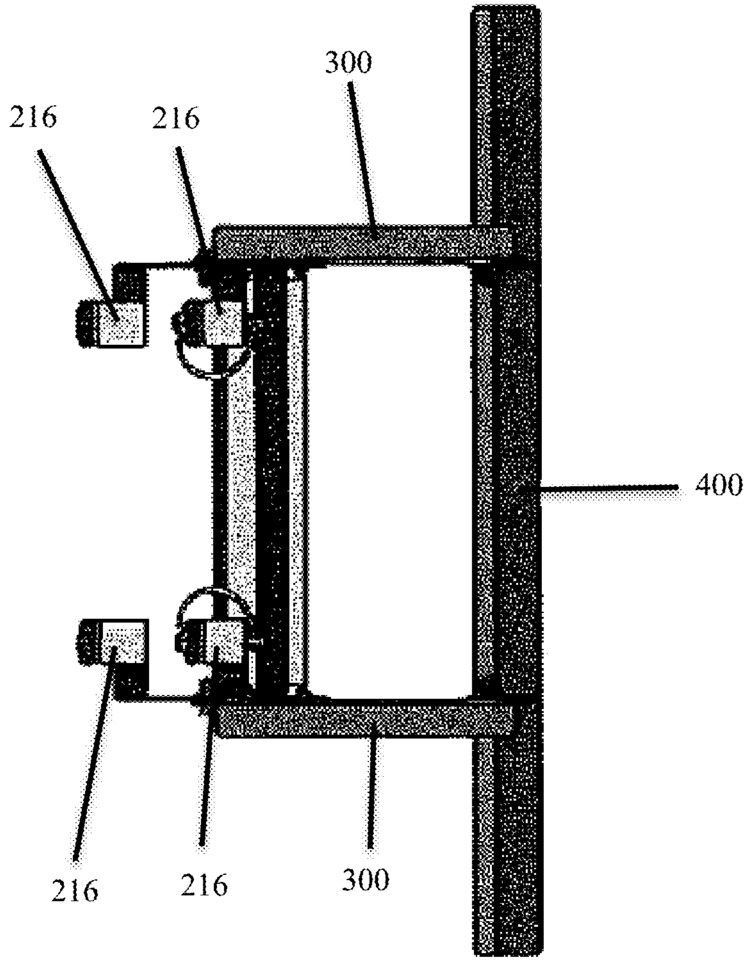
FIG. 2B is a top view of the adjustable standoff shown in FIG. 2A.
Figure 2C:
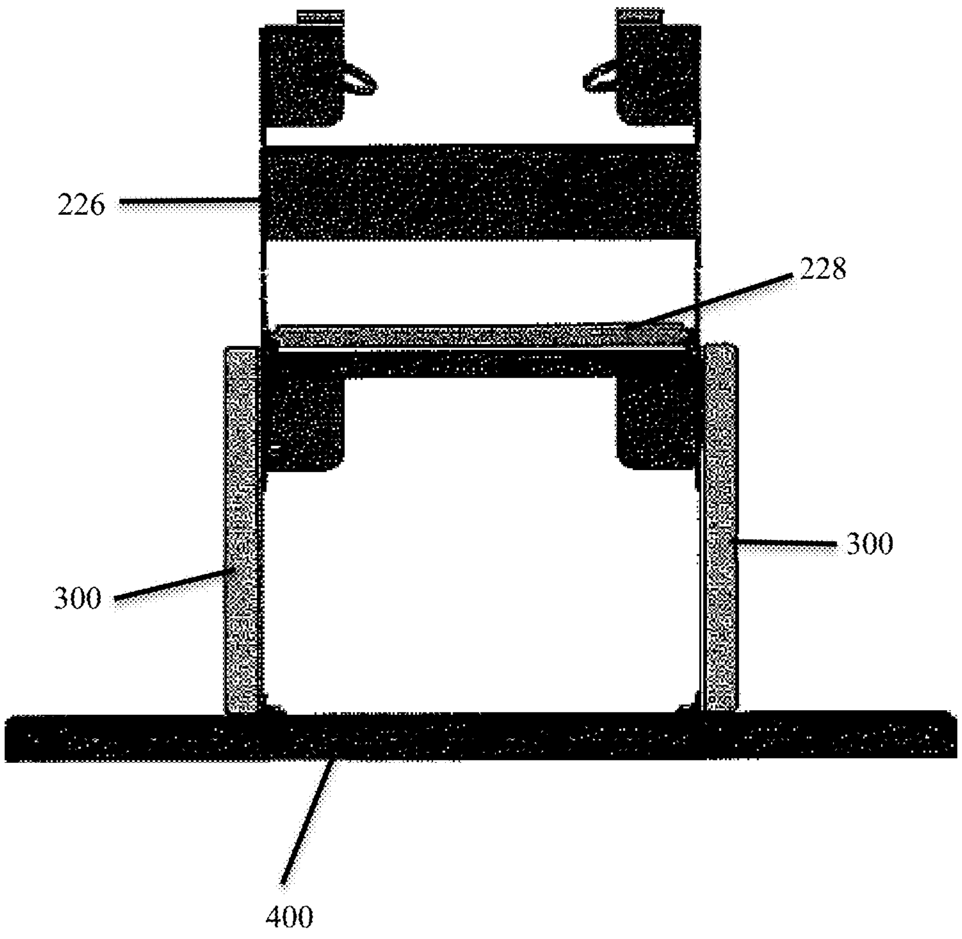
FIG. 2C is a bottom view of the adjustable standoff shown in FIG. 2A.
Figure 2D:
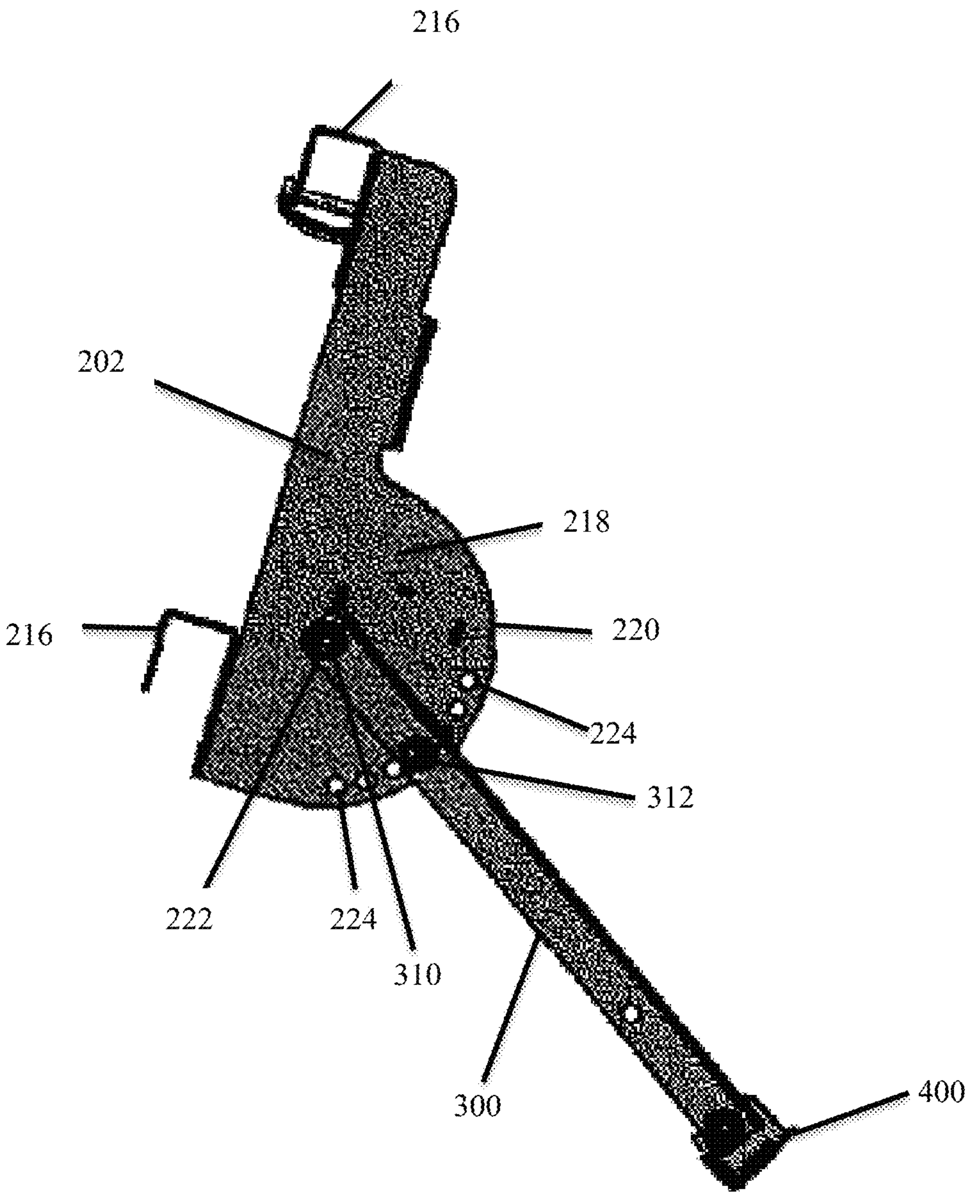
FIG. 2D is a side view of the adjustable standoff shown in FIG. 2A.

The features and benefits of the disclosed adjustable standoff for a platform hoist are illustrated and described by reference to exemplary embodiments. The disclosure also includes the drawing, in which like reference numbers refer to like elements throughout the various figures that comprise the drawing. This description of exemplary embodiments is intended to be read in connection with the accompanying drawing, which is to be considered part of the entire written description. Accordingly, the disclosure expressly should not be limited to such exemplary embodiments illustrating some possible non-limiting combinations of features that may exist alone or in other combinations of features.

In the description of embodiments, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top,” and “bottom” as well as derivatives thereof (e.g., “horizontally,” “downwardly,” “upwardly,” etc.) should be construed to refer to the orientation as then described or as shown in the drawing under discussion. These relative terms are for convenience of description only and do not require that the apparatus be construed or operated in a particular orientation. Terms such as “attached,” “affixed,” “connected,” “coupled,” “interconnected,” and similar terms refer to a relationship wherein structures are secured or attached to one another either directly or indirectly through intervening structures, as well as both movable or rigid attachments or relationships, unless expressly described otherwise.

FIG. 1 depicts an exemplary embodiment of the adjustable standoff 100 according to the present disclosure attached to the upper rungs 102 of a track system of a platform hoist. The track system includes a pair of spaced side rails 106 which may be a single piece or multiple pieces joined together by fasteners and splice plates. The side rails 106 are connected by a plurality of rungs (102, 108) extending between the side rails 106. The side rails 106 may be in the shape of an I-beam with two substantially parallel flanges connected by a web. The rungs (102, 108) may be round, d-shaped, or any shape. The adjustable standoff is attached to two upper rungs 102 which are closer to the top of the side rails 106 than the bottom.

FIGS. 2A, 2B, 2C, and 2D depict an exemplary embodiment of the adjustable standoff 100. The adjustable standoff 100 includes a frame 200. Two legs 300 are connected to the frame 200 at one end and an anchor section 400, which is adapted to be secured to the structure with a plurality of removable fasteners, at the other end. Specifically, the legs are connected to the frame 200 by: (1) a first removable fastener passing through a pivot hole 310 on the relevant leg 300 and a central hole 222 in the side of the frame 200; and (2) a second removable fastener passing through an adjustment hole 312 on the relevant leg 300 and an outer radial hole 224 in the side of the frame 200. As a result, the legs 300 may pivot around the radial edge 220 of an apse 218 that projects out from an edge of the frame 200 by removing the second fastener, repositioning the legs 300 so that the adjustment hole 312 on the relevant leg 300 lines up with a different outer radial hole 224 that results in the desired leg angle and then reinserting the second fastener. In this way the legs may be easily adjusted while still being able to stabilize the track before loads of up to 500 pounds are hoisted.

Frame

One aspect of the present invention is directed to a frame 200 including four hooks 216 adapted to engage the upper rungs 102 of a track of a platform hoist thereby not impeding the movement of a carriage up and down the track. Such hooks 216 must remain inside the rails 106 of the track so as not to impede the movement of the carriage that delivers material from the bottom of the track to the top of the track. If the hooks were to contact the rails of the track, or worse be required to engage with the rails like ladder standoffs are designed to engage ladder rails, the carriage would not be able to travel the length of the track and the hoist would be useless. As a result, in certain embodiments, the frame is less than 15 inches wide.

Figure 3A:
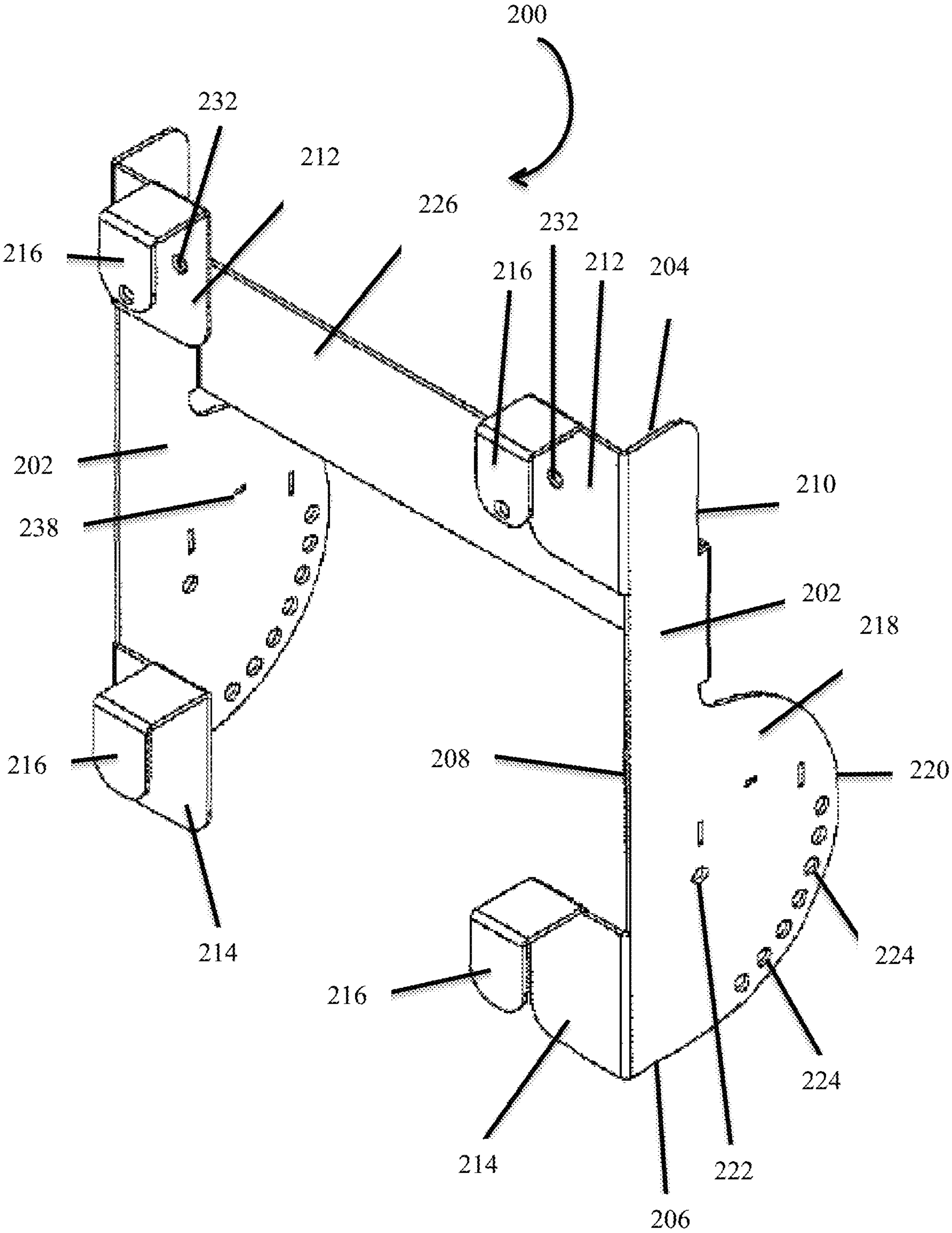
FIG. 3A is a perspective view of one embodiment of a frame of the adjustable standoff.
Figure 3B:
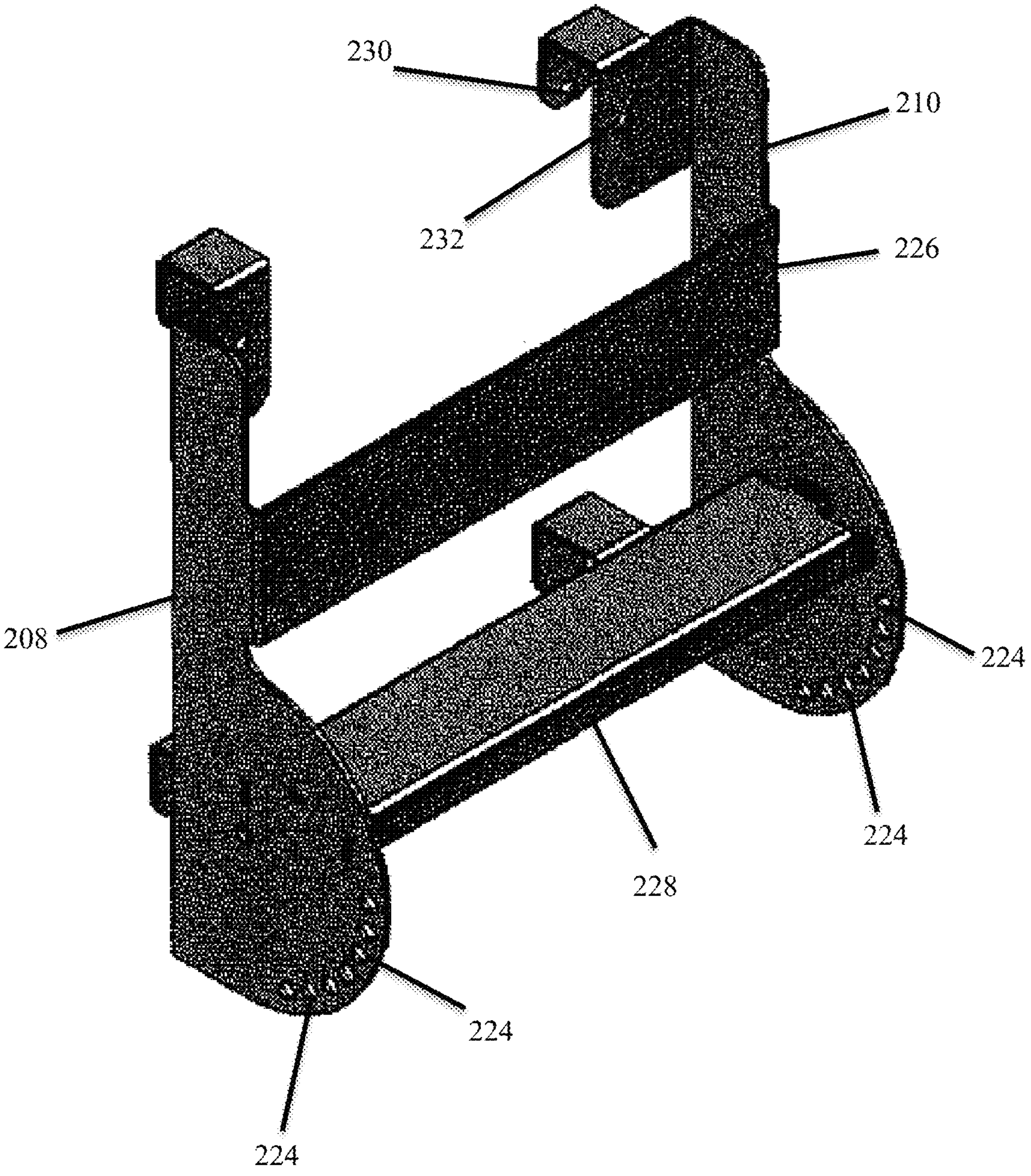
FIG. 3B is a perspective view of one embodiment of a frame of the adjustable standoff.
Figure 3C:
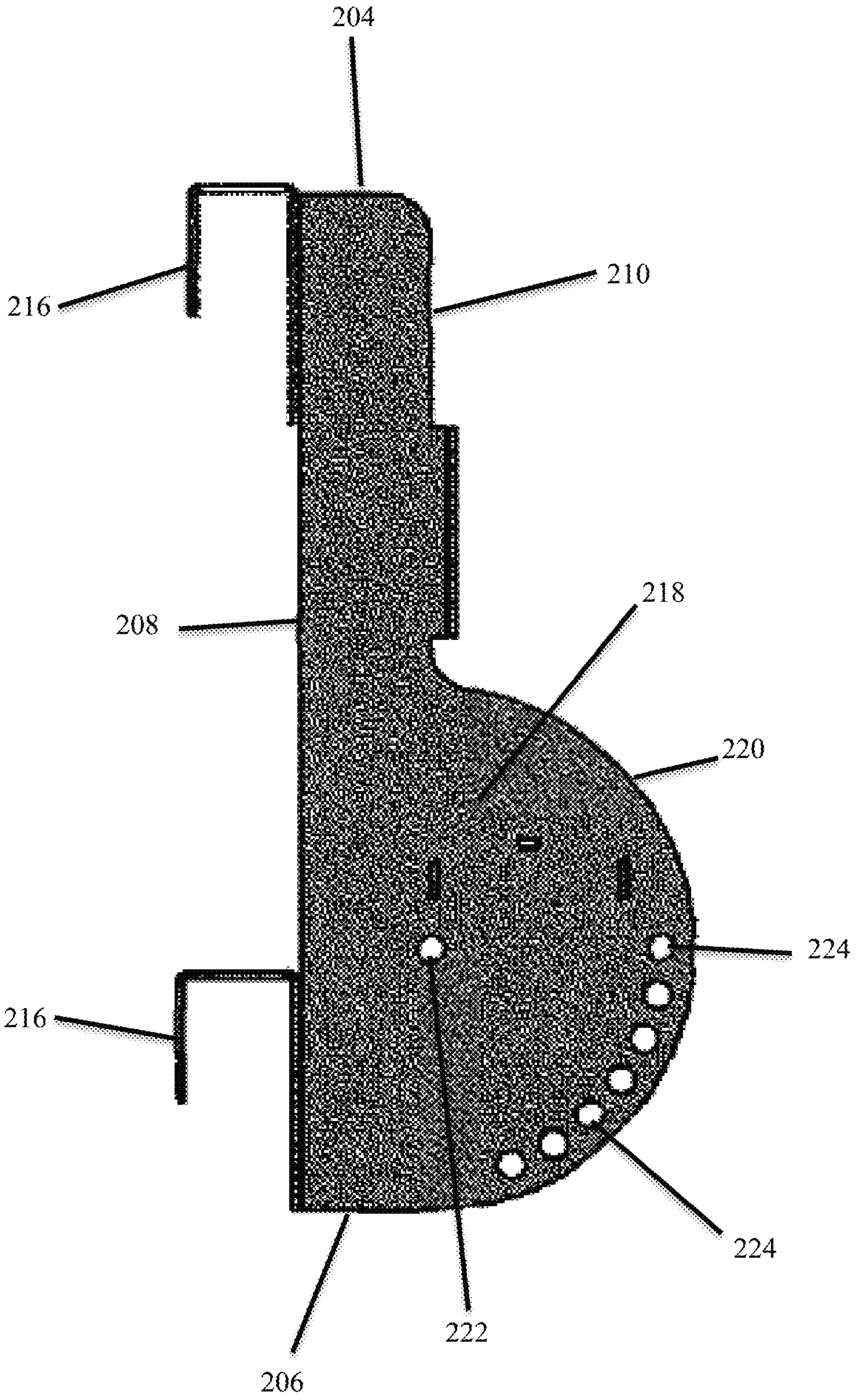
FIG. 3C is a side view of the adjustable standoff shown in FIG. 3B.
Figure 3D:
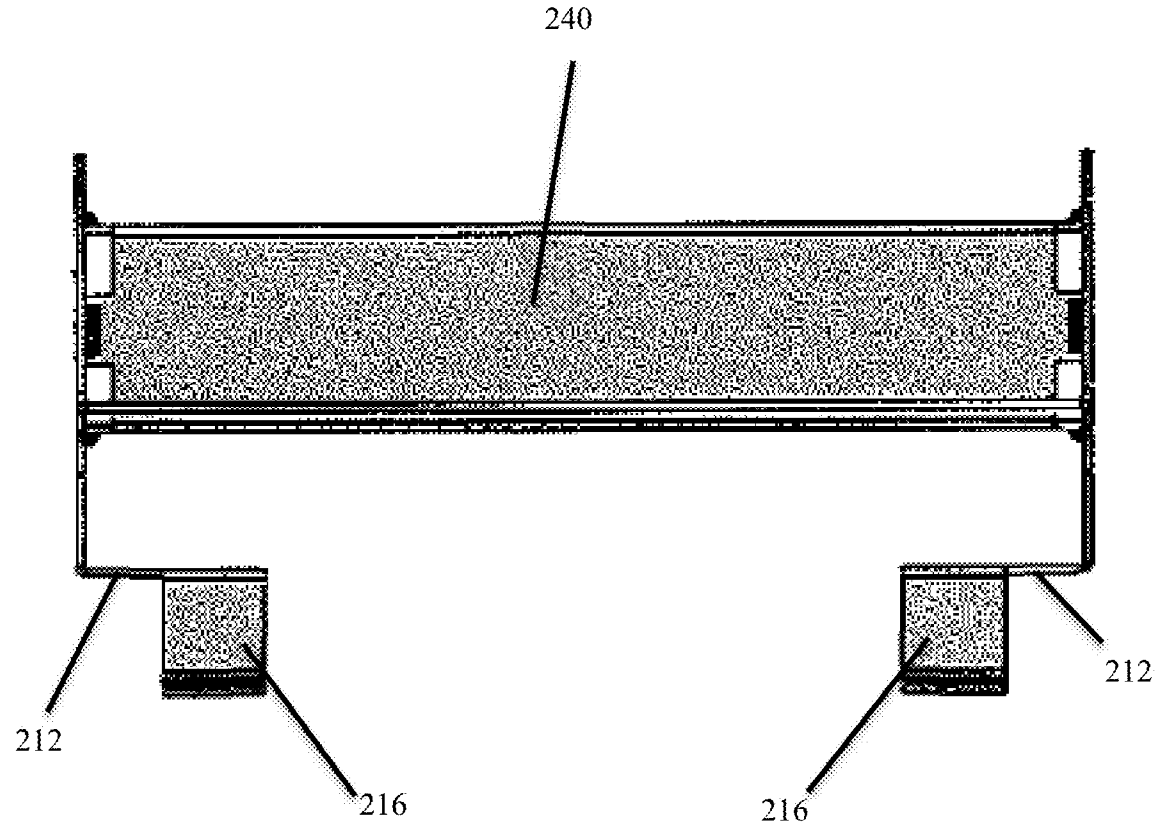
FIG. 3D is a top view of the adjustable standoff shown in FIG. 3B.
Figure 4:
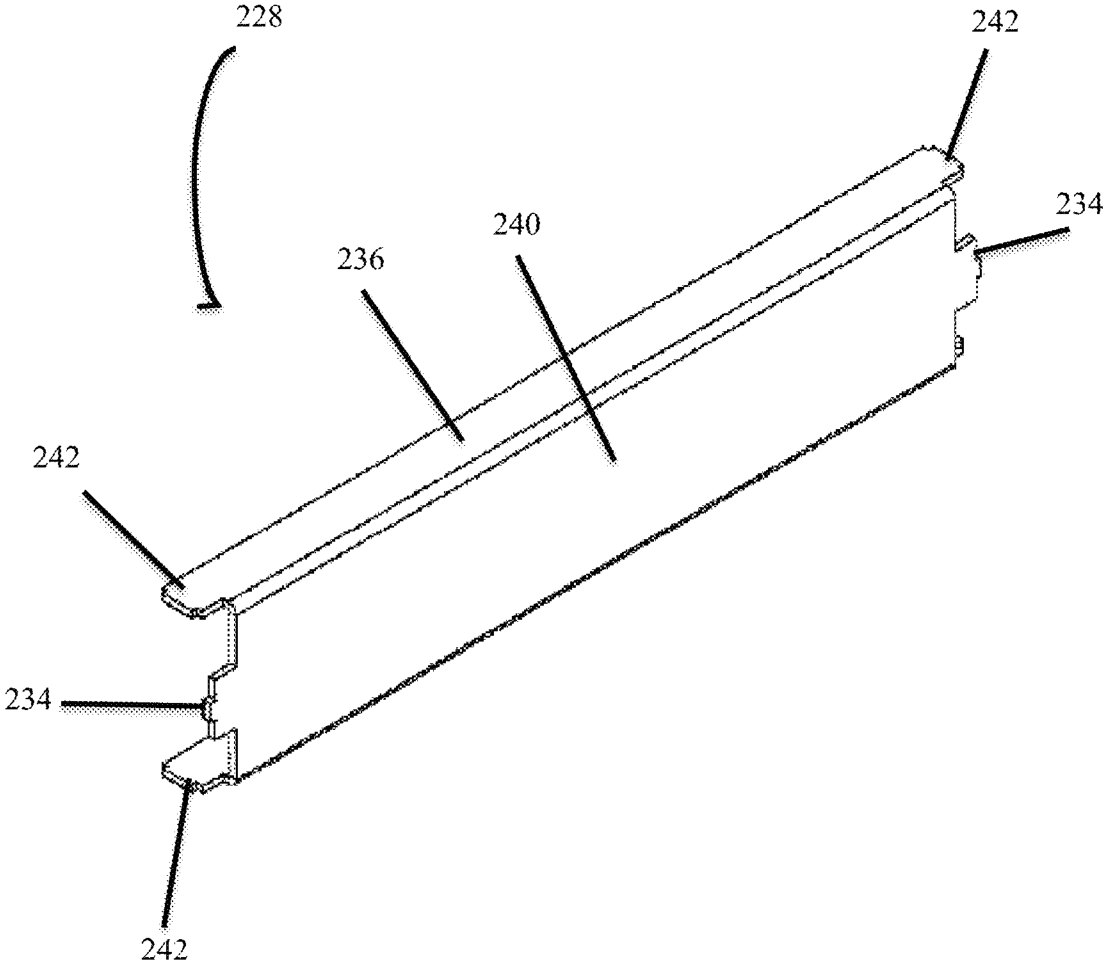
FIG. 4 is a perspective view of one embodiment of a stiffener beam of the adjustable standoff.

FIG. 3A depicts one embodiment of a frame 200. FIGS. 3B, 3C, and 3D depict the frame 200 of 3A with the addition of a stiffener beam 228. The frame 200 has a length and a width with two side assemblies 202 aligned along opposite lengths of the frame 202

Each side assembly 202, has a top edge 204 opposite a bottom edge 206 and a flange edge 208 opposite a stabilizer edge 210.

The assemblies 202 include a top flange 212 closer to the top edge 204 than a bottom flange 214. Each flange 212, 214 projects inwards from the flange edge 208 in the direction of the opposite assembly 202. Indeed, in certain embodiments, the flanges 212, 214 project inwards in a direction substantially perpendicular to the plane of the flange edge 208.

The flanges 212, 214 each include a hook 216 projecting away from the assemblies and adapted to engage the upper rungs 102 of the material transport apparatus. Indeed, in certain embodiments, the hooks project outwards in a direction substantially perpendicular to the plane of the flanges 212, 214. The hooks 216 may also be of varying size. For example, the hooks 216 projecting from the top flanges 212 may be smaller than the hooks 216 projecting from the bottom flanges 214 or vice versa. In addition, in certain embodiments, the hooks may narrow in size (e.g., bent inward towards the frame 200). For example, a hook 216 may initially be 1.8 inches in size but narrow down to 1.6 inches at its terminal end. Such a narrowing may assist in securing the upper rungs 102 to the frame 200. To securely and safely engage with the rungs of the track, the minimum size of the hooks 216 may be 1.6 inches. Furthermore, the hooks 216 may include a first pin hole 230 that is aligned with a second pin hole 232 located in the flanges 212, 214, wherein the first and second pin holes 230, 232 are adapted to allow a removable fastener, such as a pin, to pass through the pin holes 230, 232 thereby locking the upper rung 102 into the hook 216.

The assemblies 202 each include an apse 218 projecting outward from the stabilizer edge 210. The apse 218 defines a radial edge 220. In certain embodiments, the radial edge 220 begins at the bottom edge 206 and terminates at a point on the stabilizer edge 210 approximately halfway between the top edge 204 and the bottom edge 206.

The apse 218 includes a central hole 222 and a plurality of outer radius holes 224, which are all equidistant from the central hole 222 (e.g., about 3.5 inches from the central hole 222) and located closer to the radius edge 220 than the central hole 222. In certain embodiments, all points of the radius edge 220 are equidistant from the central hole 222. For example, all points on the radius edge 220 may be 4 inches from the central hole 222. The outer radius holes 224 may also be equally spaced along the radius of the apse 218. The central hole 222 and radius holes 224 are adapted to engage with a leg 300 and allow the angle at which the leg 300 projects from the stabilizer edge 210 to be adjusted. In certain embodiments the angle at which the leg 300 projects from the stabilizer edge 210 may be adjusted from 20 degrees to about 90 degrees. As there may be seven outer radius holes 224 equally spaced apart, such adjustments may occur in ten degree increments. In certain embodiments, the central hole 222 is closer to the top side 204 than any of the outer radius holes 224. The apse 218 may also include at least one stabilizer hole 238 adapted to engage at least one projection 234 on a stiffener beam 228 described in more detail below.

The assemblies 202 of the frame 200 are connected by a stabilizer section 226 running the width of the frame 200 connecting the stabilizer edge 210 of each assembly, wherein the stabilizer section 226 contacts points on the stabilizer edge 210 that are closer to the top edge 204 than the apse 218.

Due to the substantial weights that the frame 200 is adapted to support, in certain embodiments, the frame 200 may include stiffener beam 228 adapted to resist twisting or bending of the frame 200. Such a stiffener beam 228 may be an additional sheet of metal attached to the assemblies 202 via the one or more stabilizer holes 238 whereby the plane of the face 240 of the stiffener beam 228 is substantially perpendicular to the plane of the stabilizer section 226. Furthermore, in certain embodiments, the stiffener beam 228 may include a flange 236 projecting from the top, bottom, or both of the stiffener beam 228. Such flanges 236 may include additional flange projections 242 that project outward past the face of the stiffener beam 228 in the direction of the at least one projection 234.

Legs

The assemblies 202 are each attached to a leg 300, which may be about 16 inches long. As outlined above, the legs are rotatable substantially within the planes of the assemblies 202. By keeping the legs 300 within the plane of the frame assemblies 202, the standoff is able to pass the significant weight of the platform hoist exerts on the frame 200 down the legs 300 through the anchor section 400, and onto a predetermined section of the structure that the operators previously determined would not be damaged by the application of such weight.

Figure 5A:
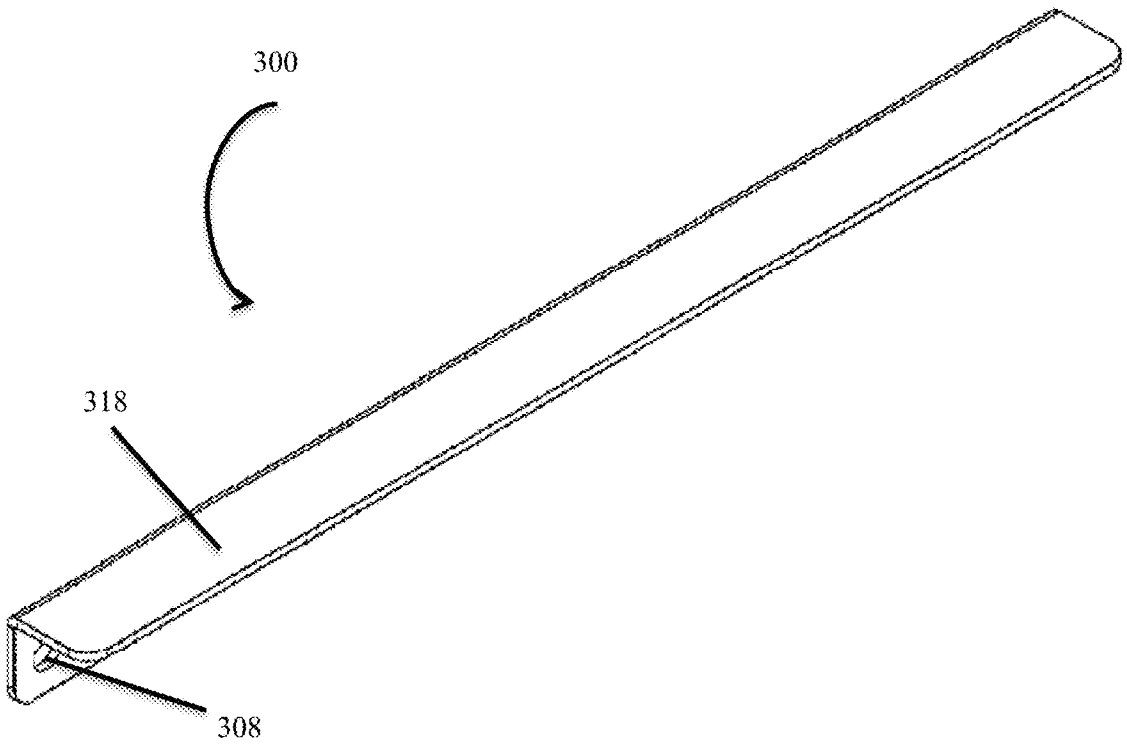
FIG. 5A is a perspective view of one embodiment of a leg of the adjustable standoff.
Figure 5B:
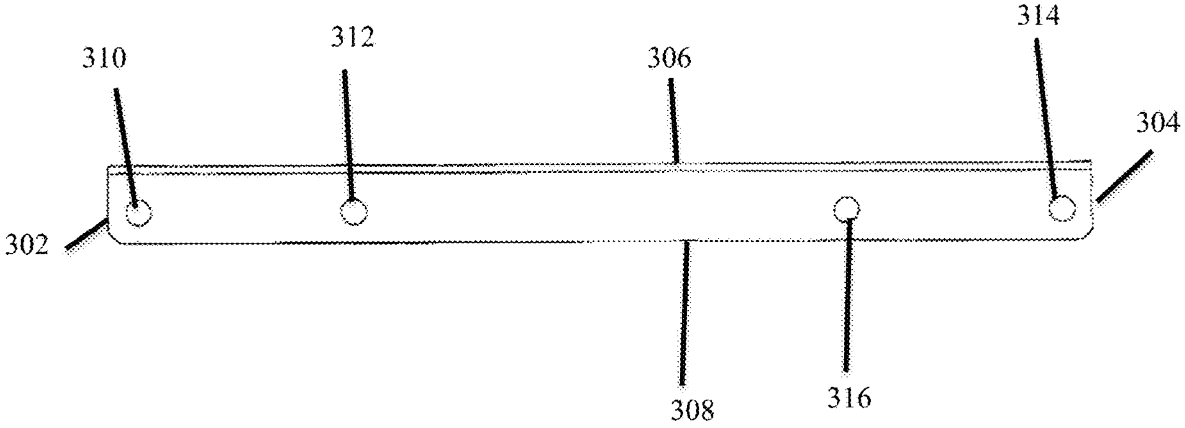
FIG. 5B is a side view of the leg shown in FIG. 5A.
Figure 6A:
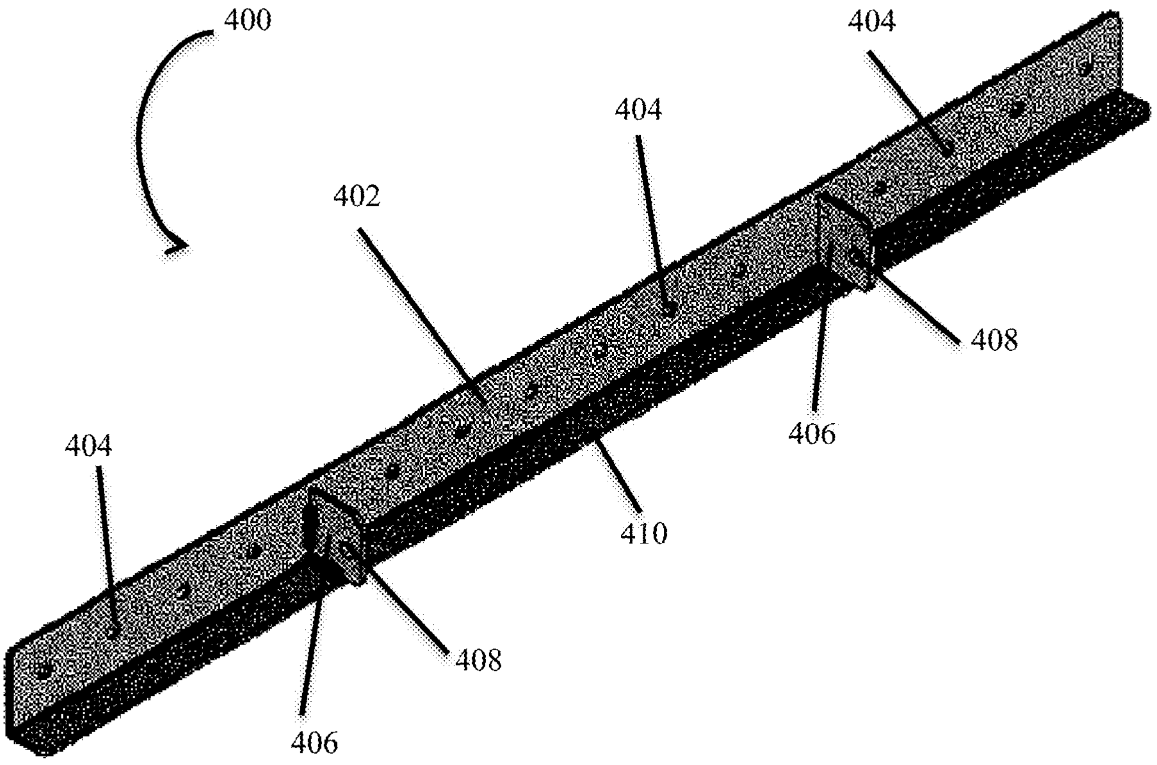
FIG. 6A is a perspective view of one embodiment of an anchor section of the adjustable standoff.
Figure 6B:
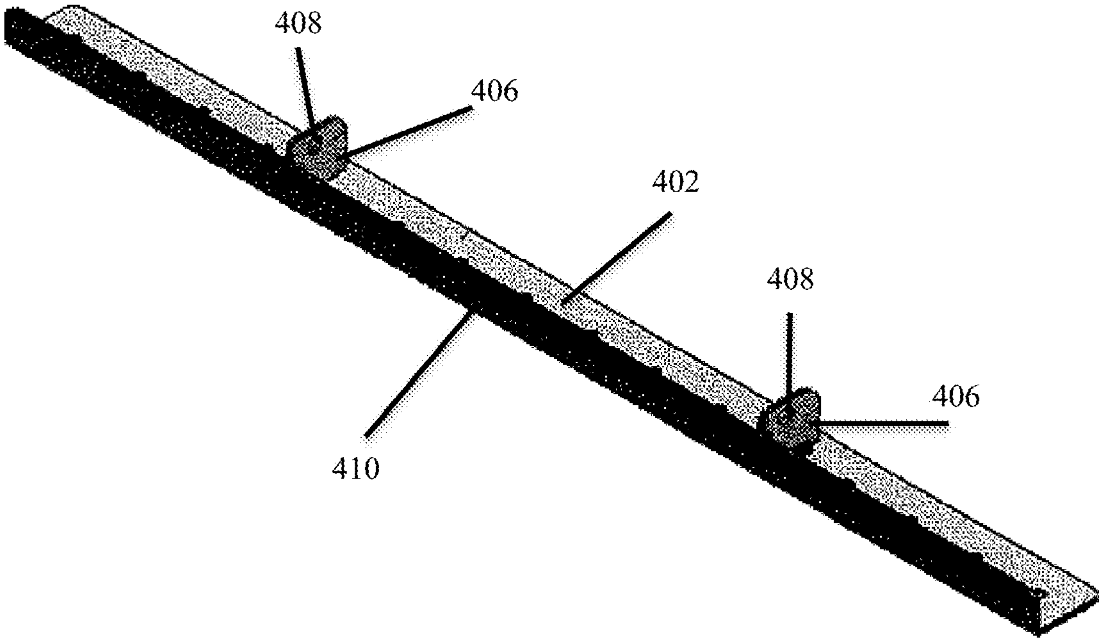
FIG. 6B is a top perspective view of the anchor section shown in FIG. 6A.
Figure 6C:
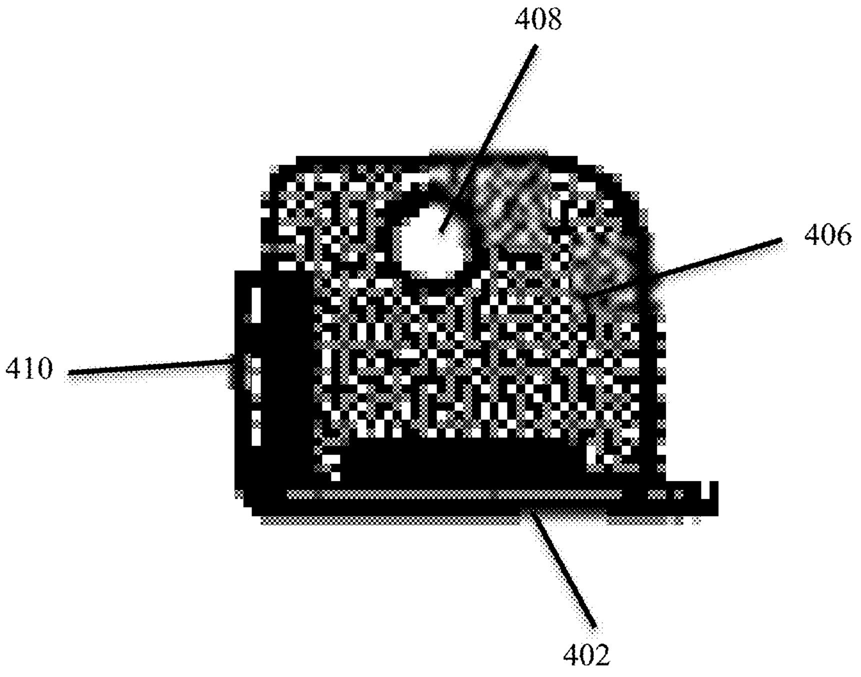
FIG. 6C is a side view of the anchor section shown in FIG. 6A.
Figure 6D:
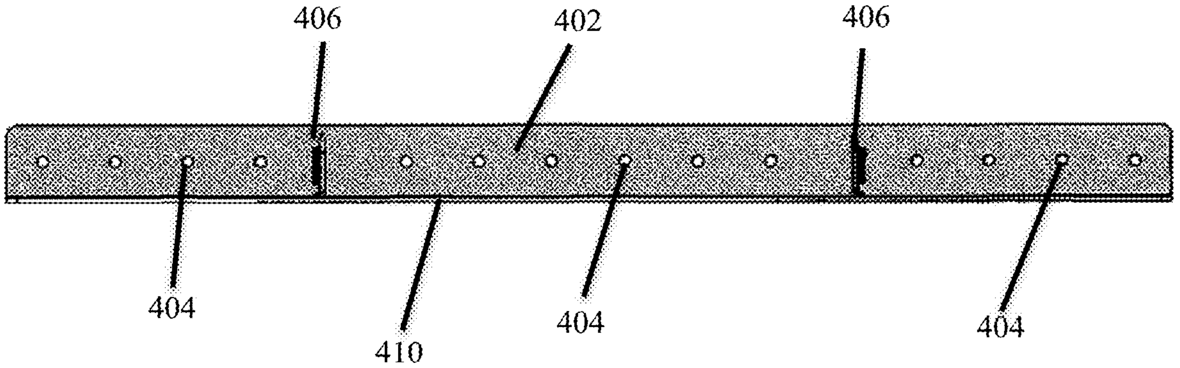
FIG. 6D is a top view of the anchor section shown in FIG. 6A.

FIGS. 5A and 5 depict a non-limiting embodiment of a leg 300. Each of the legs 300 of the adjustable standoff 100 have an assembly edge 302 and opposite anchor edge 304 along with a top side 306 and opposite bottom side 308. Each leg 300 also has a pivot hole 310, an adjustment hole 312, and an anchor hole 314. The pivot hole 310, which is a adapted to engage with the central hole 222 via a removable fastener, is closer to the assembly edges 302 than the adjustment hole 312, which is adapted to engage with one of the outer radius holes 224—depending on the angle of the leg in relation to the assembly desired by the operator—via a removable fastener. As a result of the removable engagement between the adjustment hole 312 and the outer radius holes 224, the legs are adapted to be adjusted along the radius edge 220 of the apse 218 by removable fasteners passing though the adjustment holes 312 and one of the outer radius holes 224. The anchor hole 314 is closer to the anchor edge 304 than both the pivot hole 310 and the adjustment hole 312 and is adapted to connect to the anchor section 400 via a removable fastener.

In certain embodiments, each leg 300 includes a leg flange 318 projecting from the top side 306 of the leg 300 in a direction substantially perpendicular to the plane of the leg 300. In addition, the leg 300 may further include a fourth hole 316 located the same distance from the anchor hole 314 towards the assembly edge 302 that the adjustment hole 312 is located from the pivot hole 310. By including this fourth hole 316 the same leg design may be attached to either assembly 202. Furthermore, the length of the leg (i.e., the distance between the assembly edge 302 and the anchor edge 304) may be at least 16 inches.

In certain embodiments, each leg 300 be comprised of an external pipe surrounding an internal pipe or rod. The internal pipe or rod is adapted to telescope in and out of the external pipe. In such embodiments, the length of the leg may be adjustable. Such adjustments may be secured by aligning holes in the exterior pipe and interior pipe or rod and passing a fastener or pin through the aligned holes.

Anchor Section

The legs 300 are each attached to an anchor assembly 400, which may be about 32 inches long. As outlined above, the legs are adjustable substantially within the planes of the assemblies 202. By keeping the legs 300 within the plane of the frame assemblies 202, the standoff is able to pass the significant weight of the platform hoist, and the material being transported via the platform hoist, through the frame down the legs to the anchor section and onto a predetermined section of the structure that the operators previously determined would not be damaged by the application of such weight.

The anchor section includes an anchor plate 402 having a plurality of holes 404 adapted to permit the standoff to be secured to a structure with removable fasteners. The anchor plate 402 is attached to two leg flanges 406. The leg flanges 406 project in a substantially perpendicular direction from the anchor plate 402. Each leg flange 406 further includes a leg hole 408 which is adapted to engage with the anchor hole 314 of the leg 300 with a removable fastener thereby attaching the anchor section 400 to the legs 300.

In certain embodiments, the anchor section includes an anchor flange 410 projecting in a substantially perpendicular direction from the anchor plate 402 in the direction of the leg flanges 406.

In other embodiments, the anchor section 400 may be comprised of two anchor plates 402 each of which may be less than 8 inches and further attached to the individual legs 300.

In other embodiments, the anchor section 400 may be adapted to pivot around the leg flange 406 thereby making it easier to secure the anchor section 400 to the exterior wall or roof of the structure.

Materials Used in Manufacture

The adjustable standoff 100 may be constructed of materials known to those skilled in the art (e.g., metal, carbon fiber, plastic, wood, or composite materials). In one embodiment, the frame 200, legs 300, and anchor section 400 are all made of carbon steel. To protect the material from corrosion, a powder coat may be applied to the steel.

In summary, the present invention provides an environmentally friendly platform hoist that incorporates adjustable safety apparatuses to permit a platform hoist to be easily secured to a structure.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed is:

1. An adjustable standoff for mounting on two upper rungs of a platform hoist track, having side rails connected by a plurality of rungs extending between the side rails, the standoff comprising:

a frame having a length and a width, the frame comprising two side assemblies, having a top edge opposite a bottom edge and a flange edge opposite a stabilizer edge, the assemblies aligned along opposite lengths of the frame, each assembly comprising a top flange closer to the top edge than a bottom flange, each flange projecting from the flange edge in the direction of the opposite assembly and including a hook projecting away from the assemblies, each hook adapted to engage the upper rungs of the track, and an apse projecting from the stabilizer edge, the apse having a radial edge, a center hole closer to the bottom edge than the top edge, and a plurality of outer radius holes closer to the radial edge than the center hole; and a stabilizer section running the width of the frame connecting the stabilizer edge of each assembly, wherein the stabilizer section is closer to the top edge than the apse;

two legs each having an assembly edge and opposite anchor edge, each leg comprising a pivot hole, an adjustment hole, and an anchor hole, wherein the pivot holes are closer to the assembly edges than the adjustment holes which is closer to the assembly edges than the anchor holes, wherein the legs are connected to opposite sides of the frame with removable fasteners that pass through the pivot holes and the central holes and the legs are further adapted to be adjusted along the radius edge of the apse by removable fasteners passing though the adjustment holes and one of the outer radius holes;

an anchor section comprising an anchor plate including a plurality of holes adapted to permit the anchor plate to be connected to a roof, structure, or exterior wall with removable fasteners, two leg flanges projecting in a substantially perpendicular direction from the anchor plate, each leg flange including a leg hole, wherein the anchor section is connected to the legs by removable fasteners passing through the leg holes and the anchor holes, wherein the standoff is adapted to support loads in excess of 375 pounds and not contact the side rails of the platform hoist.

2. The adjustable standoff of claim 1, wherein the top flange and bottom flanges of the assemblies projects in a substantially perpendicular direction to the plane of the assemblies.

3. The adjustable standoff of claim 1, wherein the hooks have an opening greater than 1.6 inches.

4. The adjustable standoff of claim 1, wherein the hooks of the top flanges and the top flanges each contain holes that are aligned and adapted to accept a locking pin passing through the hook and the top flange to further secure the upper rungs of the track to the hooks.

5. The adjustable standoff of claim 1, wherein the apse further includes at least one stabilizer hole adapted to engage a projection on a stiffener beam wherein the plane of the stiffener beam is substantially perpendicular to the plane of the stabilizer section.

6. The adjustable standoff of claim 1, wherein the outer radius holes of the apse are adapted to permit the legs to be adjusted along the radius edge between 20 and about 90 degrees from the bottom edge.

7. The adjustable standoff of claim 6, wherein there are seven outer radius holes equally spaced along the radius edge.

8. The adjustable standoff of claim 1, wherein the legs further include a top side opposite a bottom side and each leg includes a leg flange projecting from the top side in a direction substantially perpendicular to the plane of the leg.

9. The adjustable standoff of claim 8, wherein the legs further include a fourth hole located the same distance from the anchor hole towards the assembly edge that the adjustment hole is located from the pivot hole.

10. The adjustable standoff of claim 1 wherein the anchor section includes two anchor plates, wherein each anchor plate is attached to an individual one of the legs.

11. A platform hoist comprising:

a track comprising two rails connected by a plurality of rungs;

a carriage adapted to move up and down the track; and an adjustable standoff adapted to permit the carriage to traverse the entire length of the track, the adjustable standoff comprising:

a frame having a length and a width, the frame comprising two side assemblies, having a top edge opposite a bottom edge and a flange edge opposite a stabilizer edge, the assemblies aligned along opposite lengths of the frame, each assembly comprising a top flange closer to the top edge than a bottom flange, each flange projecting from the flange edge in the direction of the opposite assembly and including a hook projecting away from the assemblies, each hook adapted to engage upper rungs of the track, and an apse projecting from the stabilizer edge, the apse having a radial edge, a center hole closer to the bottom edge than the top edge, and a plurality of outer radius holes closer to the radial edge than the center hole; and a stabilizer section running the width of the frame connecting the stabilizer edge of each assembly, wherein the stabilizer section is closer to the top edge than the apse;

two legs each having an assembly edge and opposite anchor edge, each leg comprising a pivot hole, an adjustment hole, and an anchor hole, wherein the pivot holes are closer to the assembly edges than the adjustment holes which is closer to the assembly edges than the anchor holes, wherein the legs are connected to opposite sides of the frame with removable fasteners that pass through the pivot holes and the central holes and the legs are further adapted to be adjusted along the radius edge of the apse by removable fasteners passing though the adjustment holes and one of the outer radius holes;

an anchor section comprising an anchor plate including a plurality of holes adapted to permit the anchor plate to be connected to a roof, structure, or exterior wall with removable fasteners, two leg flanges projecting in a substantially perpendicular direction from the anchor plate, each leg flange including a leg hole, wherein the anchor section is connected to the legs by removable fasteners passing through the leg holes and the anchor holes, wherein the adjustable standoff is adapted to support loads in excess of 375 pounds and not contact the rails.

12. The adjustable standoff of claim 11, wherein the top flange and bottom flanges of the assemblies projects in a substantially perpendicular direction to the plane of the assemblies.

13. The adjustable standoff of claim 11, wherein the hooks have an opening greater than 1.6 inches.

14. The adjustable standoff of claim 11, wherein the hooks of the top flanges and the top flanges each contain holes that are aligned and adapted to accept a locking pin passing through the hook and the top flange to further secure the upper rungs of the track to the hooks.

15. The adjustable standoff of claim 11, wherein the apse further includes at least one stabilizer hole adapted to engage a projection on a stiffener beam wherein the plane of the stiffener beam is substantially perpendicular to the plane of the stabilizer section.

16. The adjustable standoff of claim 11, wherein the outer radius holes of the apse are adapted to permit the legs to be adjusted along the radius edge between 0 and about 90 degrees from the bottom edge.

17. The adjustable standoff of claim 16, wherein there are seven outer radius holes equally spaced along the radius edge.

18. The adjustable standoff of claim 11, wherein the legs further include a top side opposite a bottom side and each leg includes a leg flange projecting from the top side in a direction substantially perpendicular to the plane of the leg.

19. The adjustable standoff of claim 18, wherein the legs further include a fourth hole located the same distance from the anchor hole towards the assembly edge that the adjustment hole is located from the pivot hole.

20. The adjustable standoff of claim 11, wherein the anchor section includes two anchor plates, wherein each anchor plate is attached to an individual one of the legs.

* * * * *